(12) United States Patent
Takeuchi

(10) Patent No.: US 6,347,009 B1
(45) Date of Patent: Feb. 12, 2002

(54) ILLUMINATING LIGHT SELECTION DEVICE FOR A MICROSCOPE

(75) Inventor: Atsushi Takeuchi, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/382,460

(22) Filed: Aug. 25, 1999

Related U.S. Application Data

(63) Continuation-in-part of application No. 09/129,367, filed on Aug. 5, 1998.

(30) Foreign Application Priority Data

Aug. 6, 1997 (JP) .............................................. 9-224323
Aug. 31, 1998 (JP) ........................................... 10-246128

(51) Int. Cl.$^7$ ............................................. G02B 21/06
(52) U.S. Cl. ...................... 359/385; 359/388; 359/389; 359/390
(58) Field of Search ............................... 359/385, 388, 359/389, 390

(56) References Cited

U.S. PATENT DOCUMENTS

| | | | |
|---|---|---|---|
| 4,643,540 A | 2/1987 | Kawasaki et al. | 359/365 |
| 4,753,525 A | 6/1988 | Gaul et al. | 359/385 |
| 4,756,611 A | 7/1988 | Yonekubo et al. | 359/390 |
| 5,260,578 A | * 11/1993 | Bliton et al. | 250/461.1 |
| 5,481,401 A | * 1/1996 | Kita et al. | 359/353 |
| 5,633,752 A | 5/1997 | Tsuchiya et al. | 359/390 |
| 5,703,714 A | 12/1997 | Kojima | 359/368 |
| 5,737,134 A | 4/1998 | Watanabe et al. | 359/821 |

FOREIGN PATENT DOCUMENTS

WO   WO 86/05587   9/1986

OTHER PUBLICATIONS

U.S. Ser. No. 09/129,367, filing date Aug. 5, 1998, Atsushi Takeuchi, Nikon Corporation.

* cited by examiner

Primary Examiner—Mohammad Y. Sikder

(57) ABSTRACT

A microscope having a device for selectable illumination for observation of a specimen by ultraviolet light, DUV light, or by visible light, and which can keep ultraviolet light and visible light separate. The microscope includes a visible light illuminating system to illuminate a specimen with visible light, an ultraviolet light illuminating system to illuminate the specimen with ultraviolet light, a visible light observation system to observe the specimen illuminated by the visible light illuminating system, and an ultraviolet light observation system to observe the specimen by the ultraviolet light illuminating system. When a half mirror is arranged in the visible light illuminating system light path, a second illuminating light selection member screens the incidence of ultraviolet light into the visible light illuminating system and is moved into the visible light illuminating system light path, and when a fully reflecting mirror is arranged in the ultraviolet light illuminating system light path, a first illuminating light selection member screens the incidence of visible light into the ultraviolet light illuminating system moves into the ultraviolet light illuminating system light path.

8 Claims, 4 Drawing Sheets

ILLUMINATING LIGHT SELECTION DEVICE FOR A MICROSCOPE

CROSS REFERENCE TO RELATED APPLICATION

This application is a continuation-in-part of U.S. application No. 09/129,367, filed Aug. 5, 1998.

This application is based upon and claims priority of Japanese Patent Application No. 10-246128 filed Aug. 31, 1998, and Japanese patent application No. 9-224323, filed Aug. 6, 1997, and U.S. patent application No. 09/129,367, filed Aug. 5, 1998, the contents being incorporated herein by reference.

BACKGROUND OF THE INVENTION

1. Field of the Invention

The present invention relates to a microscope device, and, more particularly, the present invention relates to a microscope device which can selectively use ultraviolet light and visible light as illuminating light.

2. Description of the Related Art

In recent years, semiconductor device structures have achieved increased degrees of miniaturization. For example, in the case of a 16 M dynamic RAM, the line width has become about 0.5 $\mu$m.

Microscopes having a high resolving power are necessary in order to observe semiconductor devices having such a fine structure. The use of short wavelength light sources is one way in which to increase resolving power of a microscope. Prior art microscopes have generally used tungsten lamps, halogen lamps, or the like, visible light sources. However, these known light sources do not deliver ultraviolet light. In particular, with respect to extreme ultraviolet light (DUV) having a wavelength of 300 nm or less, the amount of light necessary for observation cannot be ensured.

Mercury lamps, and the like light sources, are used for illumination when ultraviolet light is required for observation. However, the image obtained using a mercury lamp is only a monochrome image, and color information, which is one item necessary for inspection, cannot be obtained. Therefore, even with a microscope device with which observation using ultraviolet light is possible, it is also necessary to be able to perform observation using visible light. However, problems occur with a known illuminating system which illuminates with both ultraviolet light (particularly DUV light) and visible light.

A filter, dichroic mirror, or the like optical element, is used to start to selectively isolate light of some wavelength. It is known to use a visible light illuminating system and an ultraviolet light illuminating system in the same microscope, using this type of optical system.

Because DUV light in particular is harmful to the human body, the microscope device using a DUV light source must have a structure which prevents incidence of the DUV light on the eye, even if by any chance the DUV light should pass through the eyepiece lens of the microscope. However, because the known microscope device having a visible light illuminating system and an ultraviolet light illuminating system in a common observation system light path separates light using a dichroic mirror having predetermined wavelength selectivity, it is difficult to completely separate ultraviolet light and visible light. For example, when a laser or the like is used as an ultraviolet light source, there is a risk that ultraviolet light passes through the dichroic mirror and leaks into the visible light observation system.

SUMMARY OF THE INVENTION

It is an object of the present invention to overcome the problems of the prior art microscopes, and to provide a microscope which can select one of ultraviolet light and visible light as illuminating light.

It is another object of the present invention to provide a microscope device which can select one of ultraviolet light and visible light as illuminating light, and which reliably prevents ultraviolet light from being incident on the visible light observation system when visible light is selected.

Objects and advantages of the present invention are achieved in accordance with embodiments of the present invention with a microscope device comprising a visible light illuminating system to illuminate a specimen with visible light; an ultraviolet light illuminating system to illuminate the specimen with ultraviolet light; a visible light observation system to observe the specimen illuminated by the visible light illuminating system; an ultraviolet light observation system to observe the specimen illuminated by the ultraviolet light illuminating system; a first optical member to guide visible light to the specimen, which visible light is reflected from the specimen, and to guide light reflected from the specimen to the visible light observation system; a first illuminating light selection member to screen the ultraviolet light observation system from incidence of visible light; a second optical member to guide ultraviolet light to the specimen, which ultraviolet light is reflected from the specimen, and to guide light reflected from the specimen to the ultraviolet light observation system; a second illuminating light selection member to screen the visible light observation system from incidence of ultraviolet light, wherein the first optical member and the first illuminating light selection member are respectively selectively capable of arrangement in the visible light illuminating system light path, and the second optical member and the second illuminating light selection member are respectively selectively capable of arrangement in the ultraviolet light illuminating system light path.

In accordance with embodiments of the present invention, the first illuminating light selection member is arranged in the visible light illuminating system light path when the first optical member is arranged in the visible light illuminating system light path, when the second illuminating light selection member is located in the ultraviolet light illuminating system light path, and when the second optical member is arranged in the ultraviolet light illuminating system light path.

In accordance with embodiments of the present invention, when the first optical member is arranged in the visible light illuminating system light path, the second illuminating light selection member moves to the ultraviolet light illuminating system light path. Further, when the second optical member is arranged in the ultraviolet light illuminating system light path, the first illuminating light selection member moves to the visible light illuminating system light path.

In accordance with embodiments of the present invention, the second illuminating light selection member can be selected corresponding to the selected first optical member, and the first illuminating light selection member can be selected corresponding to the selected second optical member.

In accordance with embodiments of the present invention, the first optical member and the second illuminating light selection member are integrally formed, and the second optical member and the first illuminating light selection member are integrally formed.

In accordance with embodiments of the present invention, it is not necessary to respectively drive individually the first optical member and the second illuminating light selection member, and the second optical member and the first illuminating light selection member. Furthermore, the drive mechanism and guides, etc., can be small. Moreover, when electric motors are used to drive the members, the number of drive motors can be small.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
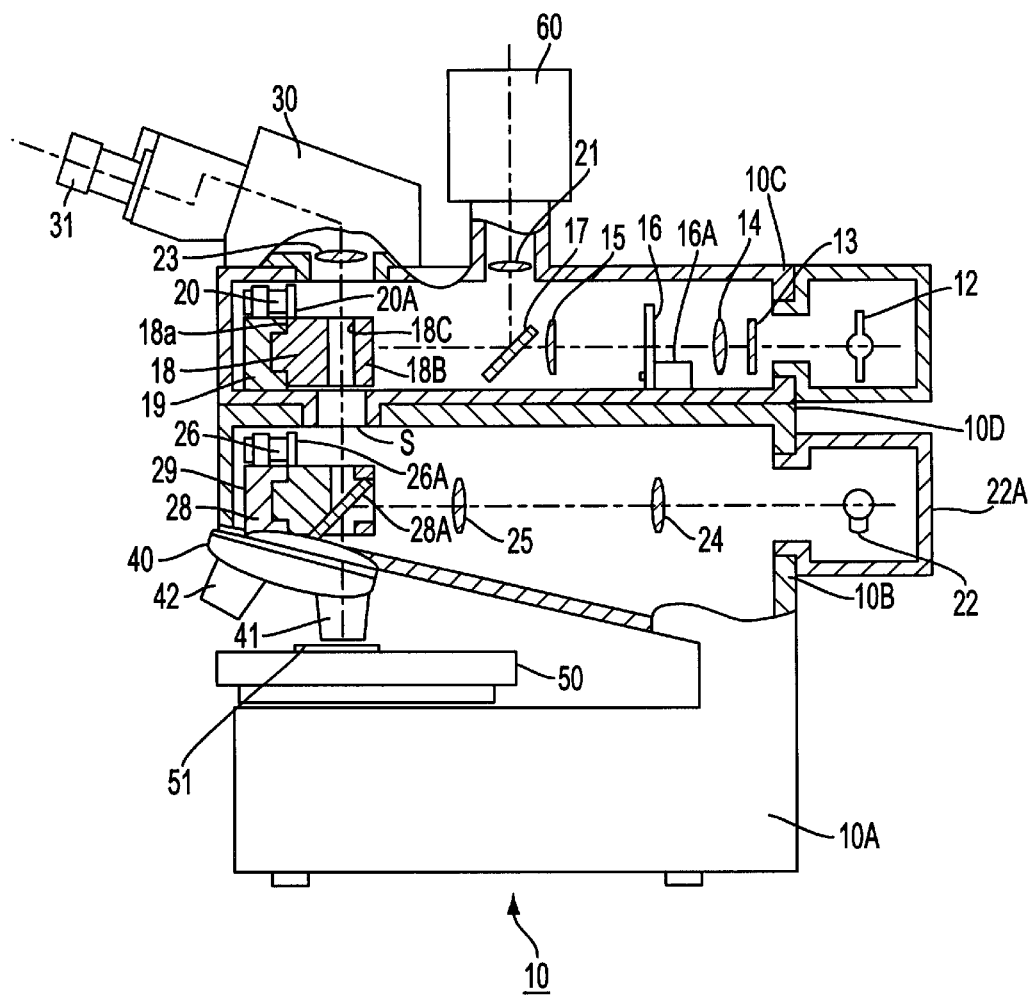
FIG. 1 is a cross-sectional diagram of a microscope device in a state when a visible light illuminating system is selected to provide an illuminating light in accordance with a first embodiment of the present invention.

Reference will now be made in detail to the preferred embodiments of the present invention, examples of which are illustrated in the accompanying drawings, wherein like reference numerals refer to like elements throughout.

Figure 2:
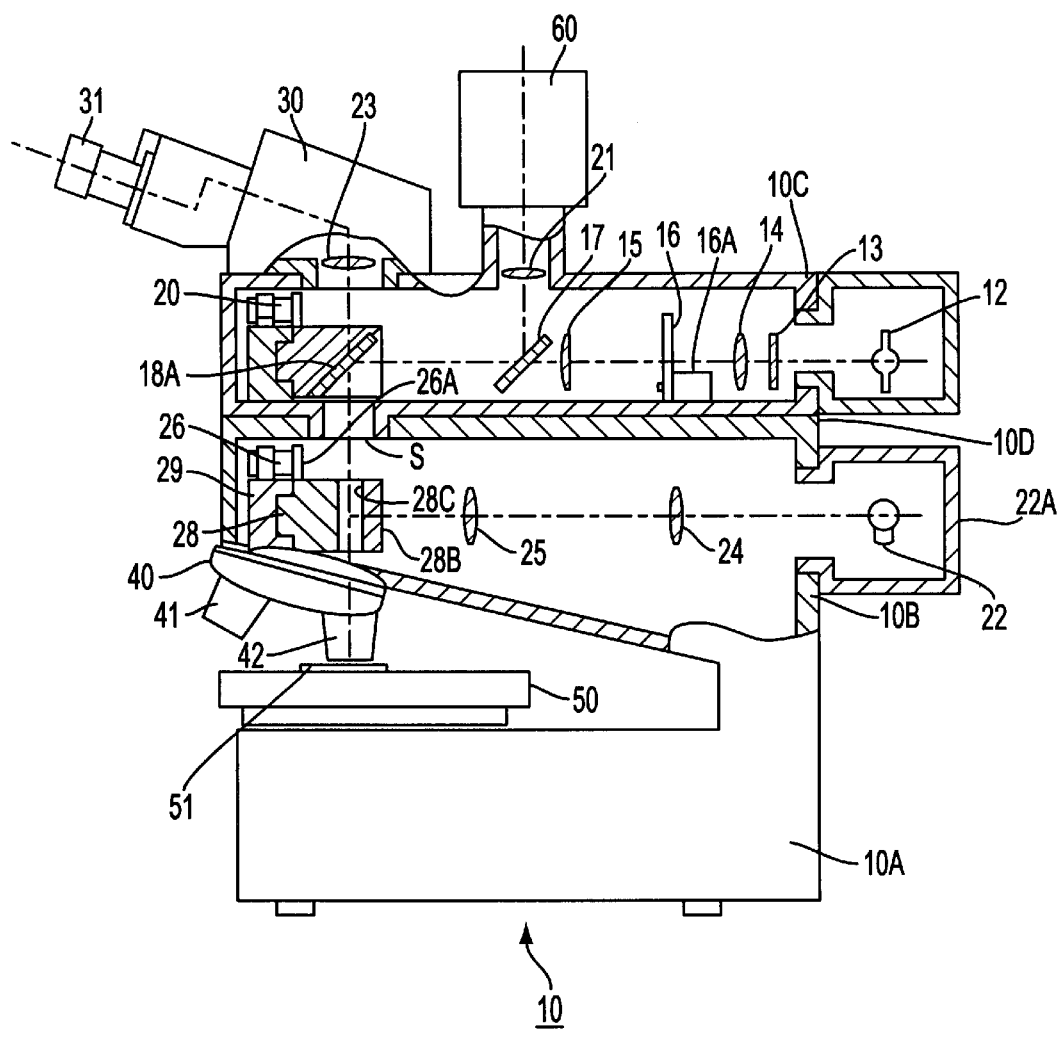
FIG. 2 is a cross-sectional diagram of a microscope device in a state when an ultraviolet light illuminating system is selected to provide an illuminating light in accordance with a first embodiment of the present invention.
Figure 3:
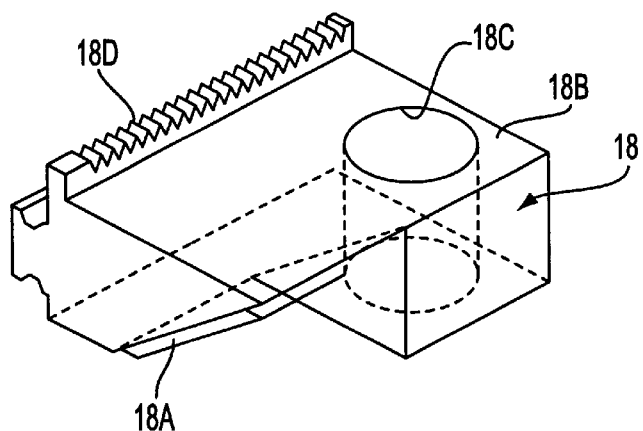
FIG. 3 is a perspective view of a second hollow block in accordance with embodiments of the present invention.

A first preferred embodiment of the present invention will be described below with reference to FIGS. 1–3. FIGS. 1 and 2 are cross-sectional diagrams of a microscope device in accordance with the first embodiment of the present invention. More specifically, FIG. 1 illustrates the microscope device in a state in which a visible light illuminating system has been selected as the illuminating system, and FIG. 2 illustrates the microscope device in a state in which an ultraviolet light illuminating system has been selected as the illuminating system. FIG. 3 is a perspective view of a second hollow block arranged in an ultraviolet light illuminating system light path in accordance with embodiments of the present invention.

As shown in FIGS. 1 and 2, the microscope device includes a microscope body 10, a body tube 30, an electric motor revolving nosepiece 40, a stage 50, and an ultraviolet light detector 60 to detect ultraviolet light.

The microscope body 10 comprises a base 10A, a column 10B, and an arm 10D. A lamp housing 22A which houses a halogen lamp 22 is disposed on the back surface side of the arm 10D. Moreover, an ultraviolet image detection unit 10C is positioned in the upper portion of the arm 10D. The ultraviolet image detection unit 10C is detachable with respect to the microscope body 10.

The body tube 30 is mounted on the top of the ultraviolet image detection unit 10C, and includes an eyepiece lens 31.

The ultraviolet light detector 60 is mounted on top of the ultraviolet image detection unit 10C, and includes a CCD (not shown) for ultraviolet light.

The electric motor revolving nosepiece 40 is mounted on a lower surface of the arm 10D, and includes plural objective lenses 41, 42 supported on the electric motor revolving nosepiece 40. The objective lens 41 is for use with visible light and the objective lens 42 is for use with ultraviolet light. A separate objective lens 41 for use with ultraviolet is provided because it is difficult to make suitable aberration corrections in the same lens for both visible light and ultraviolet light.

The stage 50 is disposed on the base 10A, and moves up and down along the optical axis of the objective lenses 41, 42.

An ultraviolet light source, such as a mercury lamp 12, and an ultraviolet light relay optical system comprising an ultraviolet filter 13, relay lenses 14, 15, a shutter 16, a half mirror 17, and a second hollow block 18 are arranged within the ultraviolet image detection unit 10C.

When visible light observation is performed, the shutter 16 is driven by a solenoid 16A such that the shutter 16 is inserted into the ultraviolet light illuminating system light path so that ultraviolet light is not incident on the visible light illuminating system light path.

The second hollow block 18 includes a fully reflecting mirror 18A (FIGS. 2 and 3) and a light screening member 18B having a through hole 18C (FIGS. 1 and 3). The second hollow block 18 can move in a direction at right angles (i.e., direction passing through the figure) with respect to the light path of the mercury lamp 12. Accordingly, either of the fully reflecting mirror 18A or the light screening member 18B can be arranged with respect to the ultraviolet light illuminating system light path. When the light screening member 18B is arranged in the ultraviolet light illuminating system light path, a center axis of the through hole 18C is positioned in the light path of the visible light observation system.

The second hollow block 18 is mounted on a fixed guide unit 19 via a ball race (not shown) which rotatably supports a plurality of balls 18a, and is movable with respect to the fixed guide unit 19. A rack 18D (FIG. 3) is formed on an upper portion of the second hollow block 18, and the rack 18D is engaged with a pinion 20A fixed to the rotation shaft of a motor 20.

The motor 20 is, for example, a DC motor. The motor 20 is fixed to the fixed guide unit 19.

A visible light source, such as a halogen lamp 22, and a visible light relay optical system comprising lenses 24, 25, and a first hollow block 28 are arranged within the arm 10D.

The first hollow block 28 includes a half mirror 28A (FIG. 1) and a light screening member 28B (FIG. 2) having a through hole 28C (FIG. 2). The first hollow block 28 can move in a direction at right angles with respect to the light path of the halogen lamp 22 (i.e., a direction passing through the figure). Accordingly, either of the half mirror 28A or the light screening member 28B can be arranged with respect to the visible light illuminating system light path.

When the light screening member 28B is arranged in the visible light illuminating system light path, the through hole 28C is positioned in the light path of the ultraviolet light observation system.

The first hollow block 28 is mounted on the fixed guide unit 29 via a ball race mechanism (not shown) which rotatably supports a plurality of balls 28a, and is capable of movement with respect to the fixed guide unit 29. A rack (not shown) is formed in the upper portion of the first hollow block 28. The rack is in gear engagement with a pinion 26A fixed to the rotary shaft of a motor 26. The motor 26 is, for example, a DC motor. The motor 26 is fixed to the fixed guide unit 29.

A dovetail formed on the lower surface of the ultraviolet image detection unit 10C is in engagement with a groove formed on the upper surface of the arm 10D. Moreover, the internal space of the ultraviolet image detection unit 10C and the internal space of the arm 10D connect via an aperture S. A light path is formed between the first hollow block 28 and the second hollow block 18 by the aperture S.

When visible light is selected as the illuminating light, the motor 26 operates and the half mirror 28A is positioned in the visible light illuminating system light path, and furthermore, the motor 20 operates and moves the light screening plate 18B into the ultraviolet light illuminating system light path. At this time, the through hole 18C is arranged in the visible light observation system light path.

Illuminating light emitted from the halogen lamp 22 is reflected by the half mirror 28A and is irradiated onto a predetermined region of a specimen 51 via the objective lens 41 used for visible light. The illuminating light optical system attains Koehler illumination with respect to the specimen 51.

After passing through the half mirror 28A, reflected light from the specimen 51 passes through the aperture S and the through hole 18C, is imaged by an imaging lens 23 in the body tube 30, and is observed as visible light by the eyepiece lens 31.

At this time, illuminating ultraviolet light from the mercury lamp 12 is screened off by the light screening member 18B and is screened off by the shutter 16. Therefore, ultraviolet light is not irradiated onto the specimen 51 nor into the visible light illuminating system (see FIG. 1).

As shown in FIG. 2, when ultraviolet light is selected as the illuminating light, the motor 20 operates and the fully reflecting mirror 18A is located in the ultraviolet light illuminating system light path, and the motor 26 operates and moves the light screening plate 28B into the visible light illuminating system light path. At this time, the through hole 28C is arranged in the ultraviolet light observation system light path.

The light emitted from the mercury lamp 12 passes through the ultraviolet filter 13 and becomes illuminating light, which is ultraviolet light only, and does not contain visible light.

The illuminating light then passes through the relay lenses 14, 15 for ultraviolet light use is transmitted through the half mirror 17, is reflected by the fully-reflecting mirror 18A, passes through the aperture S and through hole 28C to the objective lens 42 for use with ultraviolet light and polarized, and is irradiated to a predetermined region on the specimen 51.

The illuminating light optical system is constructed to attain Koehler illumination with respect to the specimen 51.

Reflected light from the specimen 51 passes through the through hole 28C and the aperture S, is reflected by the fully reflecting mirror 18A, and is reflected by the half mirror 17 through to the detector 60 for detecting ultraviolet light.

Light reflected by the half mirror 17 is imaged by the imaging lens 21 for use with ultraviolet light, and is received by the CCD for ultraviolet light use in the ultraviolet light detector 60. The ultraviolet light received by the CCD for ultraviolet light use is converted into electrical signals, made visible by a monitor (not shown), and is observed.

At this time, because the illuminating light from the halogen lamp 22 is screened off by the first illuminating light selection member 28B, visible light is not irradiated to the specimen 51 nor to the ultraviolet light observation system (see FIG. 2).

In accordance with the embodiment of the invention shown in FIGS. 1–3, even when changing between observation with visible light and observation with ultraviolet light, ultraviolet light and visible light can be reliably separated. As a result, even when using DUV light as the light source, there is no risk of DUV light passing through the eyepiece lens and being incident on the eye of an observer.

Moreover, when ultraviolet light observation is performed, visible light can be prevented from entering the ultraviolet light observation system and giving rise to flare or ghosting.

Figure 4:
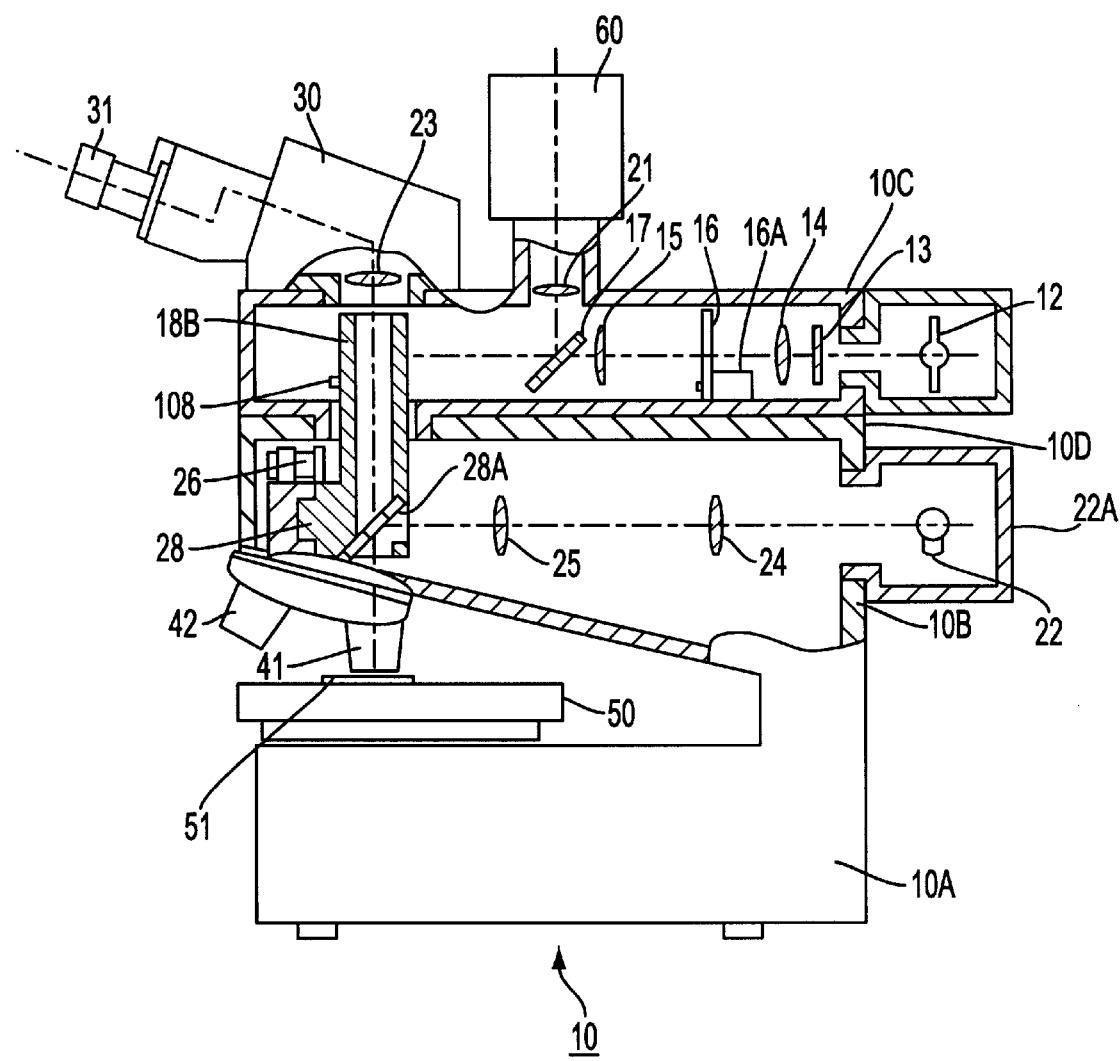
FIG. 4 is a cross-sectional diagram of a microscope device in a state when a visible light illuminating system is selected to provide an illuminating light in accordance with a second embodiment of the present invention.
Figure 5:
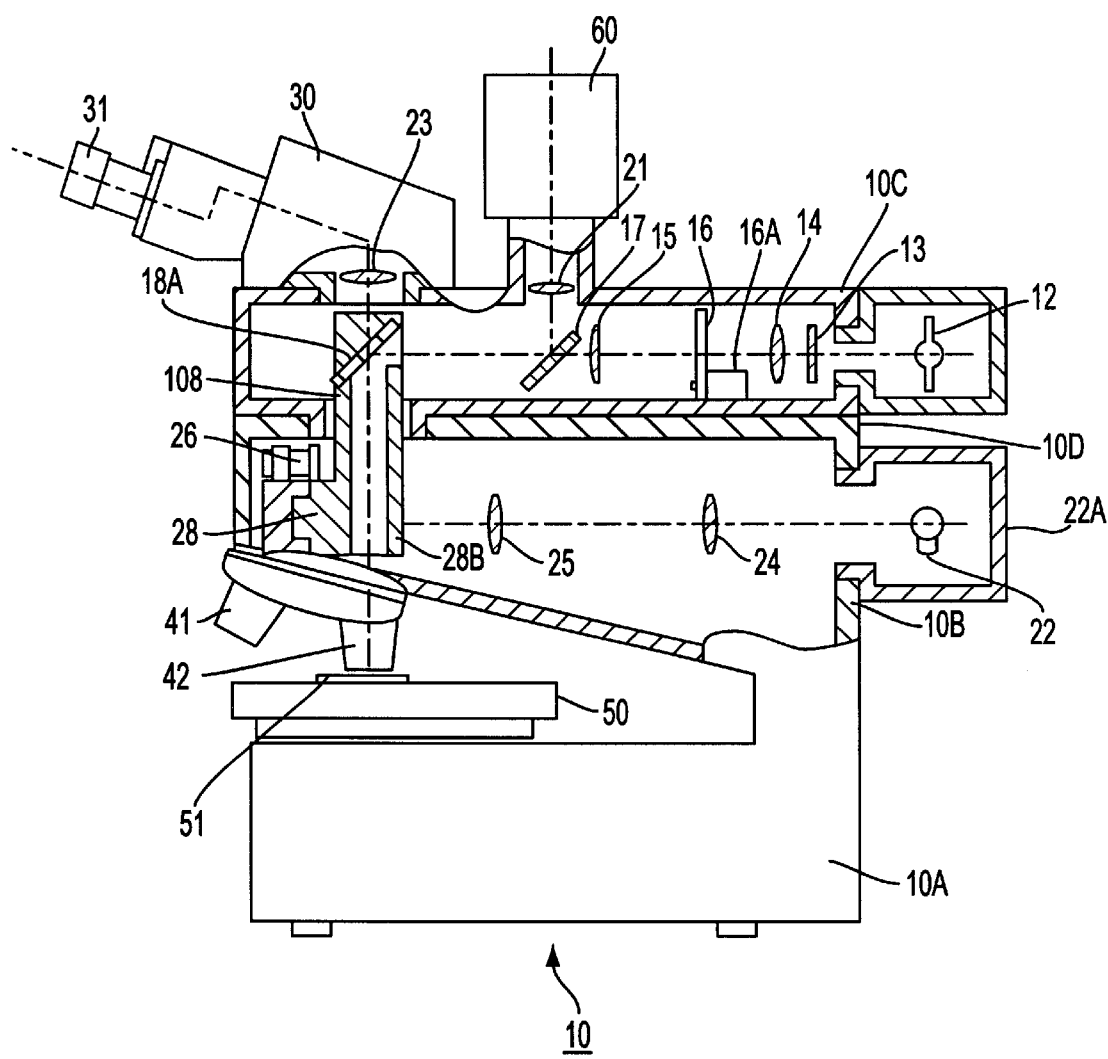
FIG. 5 is a cross-sectional diagram of a microscope device in a state when an ultraviolet light illuminating system is selected to provide an illuminating light in accordance with a second embodiment of the present invention.

FIGS. 4 and 5 are cross-sectional views a microscope device in accordance with a second embodiment of the present invention. Elements shown in FIGS. 4 and 5 which are the same as those shown in FIGS. 1–3, and described with respect to the first embodiment of the invention, are referred to by the same reference symbols, and a detailed description of the like elements will not be repeated.

FIG. 4 shows a microscope in a state when visible light is selected as the illuminating light, and FIG. 5 shows a microscope in a state when ultraviolet light is selected as the illuminating light.

The embodiment of the invention shown in FIGS. 4 and 5 differs from the first embodiment of the invention in that the light screening member 18B is integrated with the upper portion of the half mirror 28A, and the fully-reflecting mirror 18A is integrated with the upper portion of the light screening member 28B, forming a block 108 having a two-step construction, such that the block 108 is driven only by the motor 26 of the arm 10D.

In accordance with the embodiment of the invention shown in FIGS. 4 and 5, results similar to those of the first embodiment are obtained.

Moreover, in accordance with the embodiment shown in FIGS. 4 and 5, because individual driving of the first hollow block 28 and the second hollow block 18 is not necessary, there may be one each of a motor, rack and guide. Accordingly, the construction can be simplified and the cost reduced, resulting in an inexpensive device.

The present invention is not limited to the embodiment examples described above, and various modifications are possible. For example, the first hollow block 28 and the second hollow block 18 are driven by motors in each of the above-described embodiments. However, the first hollow block 28 and the second hollow block 28 may be made to be moved by hand.

Moreover, the half mirror 28A and the light screening member 28B are formed integrally by the first hollow block 28. However, the half mirror 28A and the light screening member 28B may be made separate.

Furthermore, the fully-reflecting mirror 18A and the light screening member 18B are formed integrally by the second hollow block 18. However, the fully-reflecting mirror 18A and the light screening member 18B may be separate.

Moreover, in each of the above-described embodiments, the ultraviolet light illuminating system is arranged above the visible light illuminating system. However, the visible light illuminating system may be arranged above the ultraviolet light illuminating system. At this time, the detector 60 for detecting ultraviolet light is mounted on a side surface of the arm 10D.

Furthermore, in each of the above-described embodiments, a mercury lamp was used as the ultraviolet light source. However, because it is difficult to provide a necessary and sufficient amount of light for observation, particularly in the case of DUV light, a laser which irradiates ultraviolet light or DUV light may be used as the light source instead of the mercury lamp.

Moreover, the ultraviolet image detection unit 10C and arm 10D have been described as separable. However, if the visible light and ultraviolet light are completely separated, each unit may be formed as an integral structure.

The microscope device described hereinabove in accordance with embodiments of the present invention reliably prevents entry of ultraviolet light into the visible light observation system light path when visible light has been selected as the illuminating light.

The microscope device in accordance with embodiments of the present invention provides an easy operation of changing the type of illuminating light, and prevents erroneous operation.

The microscope device in accordance with embodiments of the present invention provides a simplified structural design, and the structural cost is reduced.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A microscope device, comprising:

a visible light illuminating system to illuminate a specimen with visible light;

an ultraviolet light illuminating system to illuminate the specimen with ultraviolet light;

a visible light observation system to observe the specimen illuminated by the visible light illuminating system;

an ultraviolet light observation system to observe the specimen illuminated by the ultraviolet light illuminating system;

a first optical member to guide visible light to the specimen, which visible light is reflected from the specimen, and to guide the light reflected from the specimen to the visible light observation system;

a first illuminating light selection member to screen the ultraviolet light observation system from incidence of visible light;

a second optical member to guide ultraviolet light to the specimen, which ultraviolet light is reflected from the specimen, and to guide the light reflected from the specimen to the ultraviolet light observation system; and a second illuminating light selection member to screen the visible light observation system from incidence of ultraviolet light, wherein the first optical member and the first illuminating light selection member are respectively selectively capable of arrangement in the visible light illuminating system light path, the second optical member and the second illuminating light selection member are respectively selectively capable of arrangement in the ultraviolet light illuminating system light path, the second illuminating light selection member moves to the ultraviolet light illuminating system light path in response to the first optical member being arranged in the visible light illuminating system light path, and the first illuminating light selection member moves to the visible light illuminating system light path in response to the second optical member being arranged in the ultraviolet light illuminating system light path.

2. A microscope device as recited in claim 1, further comprising a prohibiting device to prohibit the incidence of ultraviolet light into the visible light observation system when observing the specimen using the visible light observation system.

3. A microscope device as recited in claim 2, wherein the prohibiting device comprises a shutter arranged in the ultraviolet light illuminating system light path to block the ultraviolet light.

4. A microscope device as recited in claim 3, wherein the prohibiting device comprises a light screening member which is moved to the ultraviolet light illuminating system light path when the specimen is observed using the visible light observation system.

5. A microscope device, comprising:

a visible light illuminating system to illuminate a specimen with visible light;

an ultraviolet light illuminating system to illuminate the specimen with ultraviolet light;

a visible light observation system to observe the specimen illuminated by the visible light illuminating system;

an ultraviolet light observation system to observe the specimen illuminated by the ultraviolet light illuminating system;

a first optical member to guide visible light to the specimen, which visible light is reflected from the specimen, and to guide the light reflected from the specimen to the visible light observation system;

a first illuminating light selection member to screen the ultraviolet light observation system from incidence of visible light;

a second optical member to guide ultraviolet light to the specimen, which ultraviolet light is reflected from the specimen, and to guide the light reflected from the specimen to the ultraviolet light observation system; and a second illuminating light selection member to screen the visible light observation system from incidence of ultraviolet light, wherein the first optical member and the first illuminating light selection member are respectively selectively capable of arrangement in the visible light illuminating system light path, the second optical member and the second illuminating light selection member are respectively selectively capable of arrangement in the ultraviolet light illuminating system light path, the first optical member and the second illuminating light selection member are integrally formed, and the second optical member and the first illuminating light selection member are integrally formed.

6. A microscope device as recited in claim 5, further comprising a prohibiting device to prohibit the incidence of ultraviolet light into the visible light observation system when observing the specimen using the visible light observation system.

7. A microscope device as recited in claim 6, wherein the prohibiting device comprises a shutter arranged in the ultraviolet light illuminating system light path to block the ultraviolet light.

8. A microscope device as recited in claim 7, wherein the prohibiting device comprises a light screening member which is moved to the ultraviolet light illuminating system light path when the specimen is observed using the visible light observation system.

* * * * *